June 11, 1957  G. W. SMITH  2,795,142
GYROSCOPE CAGING AND ERECTING SYSTEM
Filed Dec. 8, 1953  3 Sheets-Sheet 3

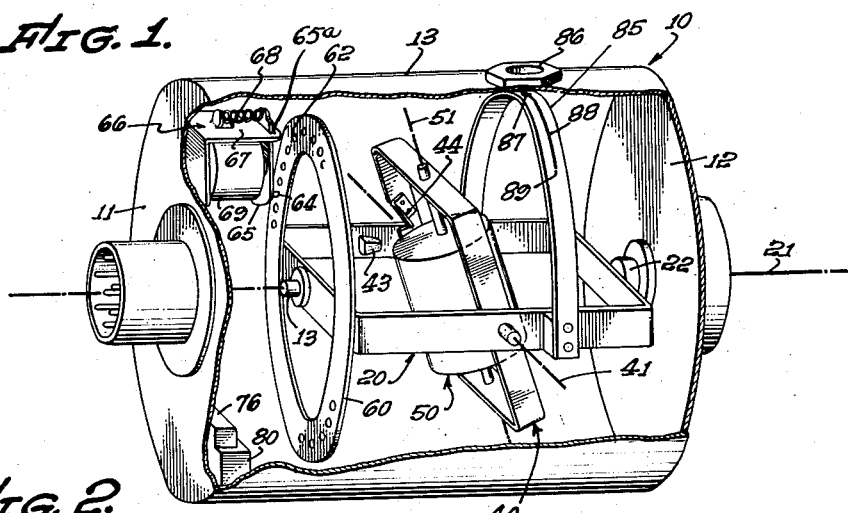

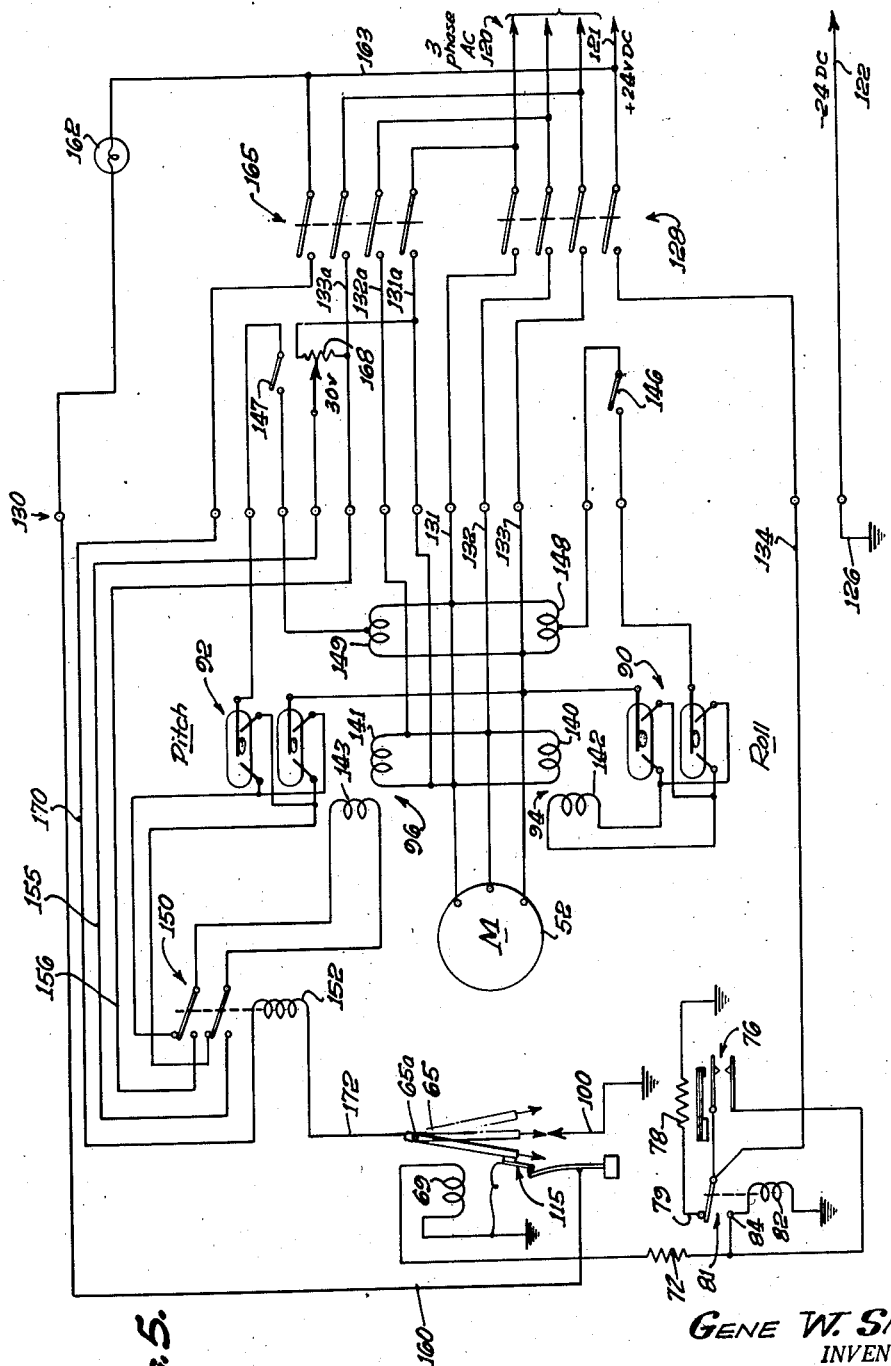

GENE W. SMITH,
INVENTOR.

BY
ATTORNEYS

United States Patent Office 2,795,142
Patented June 11, 1957

2,795,142

GYROSCOPE CAGING AND ERECTING SYSTEM

Gene W. Smith, La Canada, Calif., assignor to G. M. Giannini & Co. Inc., Pasadena, Calif., a corporation of New York Application December 8, 1953, Serial No. 396,945

10 Claims. (Cl. 74—5.1)

This invention is concerned with gyroscopes of the type that employ a rotor journaled on a double gimbal mounting that permits rotational freedom for the rotor axis about two axes of rotation; and, more particularly, the invention has to do with means for restricting the movement of the outer gimbal during acceleration of the rotor to normal operating speed and for utilizing that acceleration to orient the inner gimbal.

It is well known that when power is first applied to the rotor drive of a gyroscope of the type described the accelerating torque tends to produce objectionably violent motion of the outer gimbal. Many devices have been described for avoiding such motion by holding the gimbals forcibly in some definite relative position during the process of rotor acceleration, and releasing them only after acceleration has been completed. For example, United States Patent 2,415,899, issued on February 18, 1947, to Vernon H. Meyer and Joseph C. Cantley, describes an air-driven gyroscope in which both gimbals are locked while the rotor is brought up to speed, and are then released by reduction of air pressure supplied to the driving means. And United States Patent 2,521,379, issued on September 5, 1950, to Ward Leathers and George S. Di Monico, describes a gyroscope caging device which is released after a time delay sufficient to permit the rotor to attain full speed, the delay being obtained by means of a thermally controlled time delay switch. The former patent provides no means for automatically caging the gyroscope after use, while the means provided for that purpose by the latter patent is complicated by the necessity of locking the rotor axis with respect to both of its degrees of freedom.

A primary purpose of the present invention is to provide particularly simple and economical caging means for a gyroscope of the type described. In preferred form of the invention the rotor axis is caged with respect to only one of its degrees of freedom, greatly simplifying the required structure. As will be illustratively described, the outer gimbal of the gyroscope is caged in substantially its normal operating position, the inner gimbal being left completely free, subject only to normal limit stops on its movement. In accordance with one aspect of the invention, the outer gimbal may be oriented for caging by specially controlled action of the same power means that erects the inner gimbal during normal operation of the gyroscope.

When both the inner and outer gimbals are not caged in accurately controlled position before applying power to the rotor, it is desirable to provide means for rapidly erecting the rotor axis after application of power so that the gyroscope may be put rapidly into effective use. Ordinarily in a vertical gyroscope means are provided for maintaining the rotor axis vertical during normal operation by correcting any small departures from vertical that may occur. Such erecting means need not for that purpose provide a large erecting torque, since the angles involved are ordinarily rather small; and such means may not need to be operative at all at very large angles of deviation from normal operating position. However, some means must be then provided for initially orienting the gimbals in substantially their correct position, from which the normal erecting means can take over control.

An important aspect of the present invention has to do with a very simple manner of providing that initial approximate erection of the inner gimbal with respect to the outer gimbal. That initial erection devices of the invention can operate effectively to correct deviation angles close to 90 degrees. Hence no other special orienting device for the inner gimbal is required. However, stops are preferably provided to limit the movement of the inner gimbal to approximately 85° from normal position in either direction, a range of movement which does not include alignment of the rotor axis with the plane of the gimbal axes. In accordance with the invention, initial erection of the type described is produced directly by the reaction torque that is exerted upon the inner gimbal by the motor during acceleration of the rotor to operating speed. The initial stages of that acceleration cannot effectively be utilized for that purpose, since the outer gimbal must be locked during that time to prevent it from moving too violently. But it has been discovered that it is possible to release the outer gimbal at an intermediate point of the rotor acceleration such that the rotor speed is already sufficient to effectively stabilize the outer gimbal when released, and that there remains sufficient acceleration of the rotor to provide effective erection of the inner gimbal.

A full understanding of the invention and of its further objects and advantages will be had from the following description of certain illustrative embodiments, of which description the accompanying drawings form a part. It will be understood that the described structure and arrangement are intended merely as illustration, and that many changes may be made therein without departing from the scope of the invention, which is defined in the appended claims.

In the drawings:

Fig. 1 is a schematic perspective representing one embodiment of the invention;

Fig. 2 is a schematic diagram of typical electrical connections in the embodiment of Fig. 1;

Fig. 3 is a schematic perspective representing a modification.

Figs. 4A, 4B and 4C are fragmentary schematic sections on line 4—4 of Fig. 3 illustrating three typical stages of operation;

Fig. 5 is a schematic diagram of typical electrical connections in the modification of Fig. 3.

Figure 6:
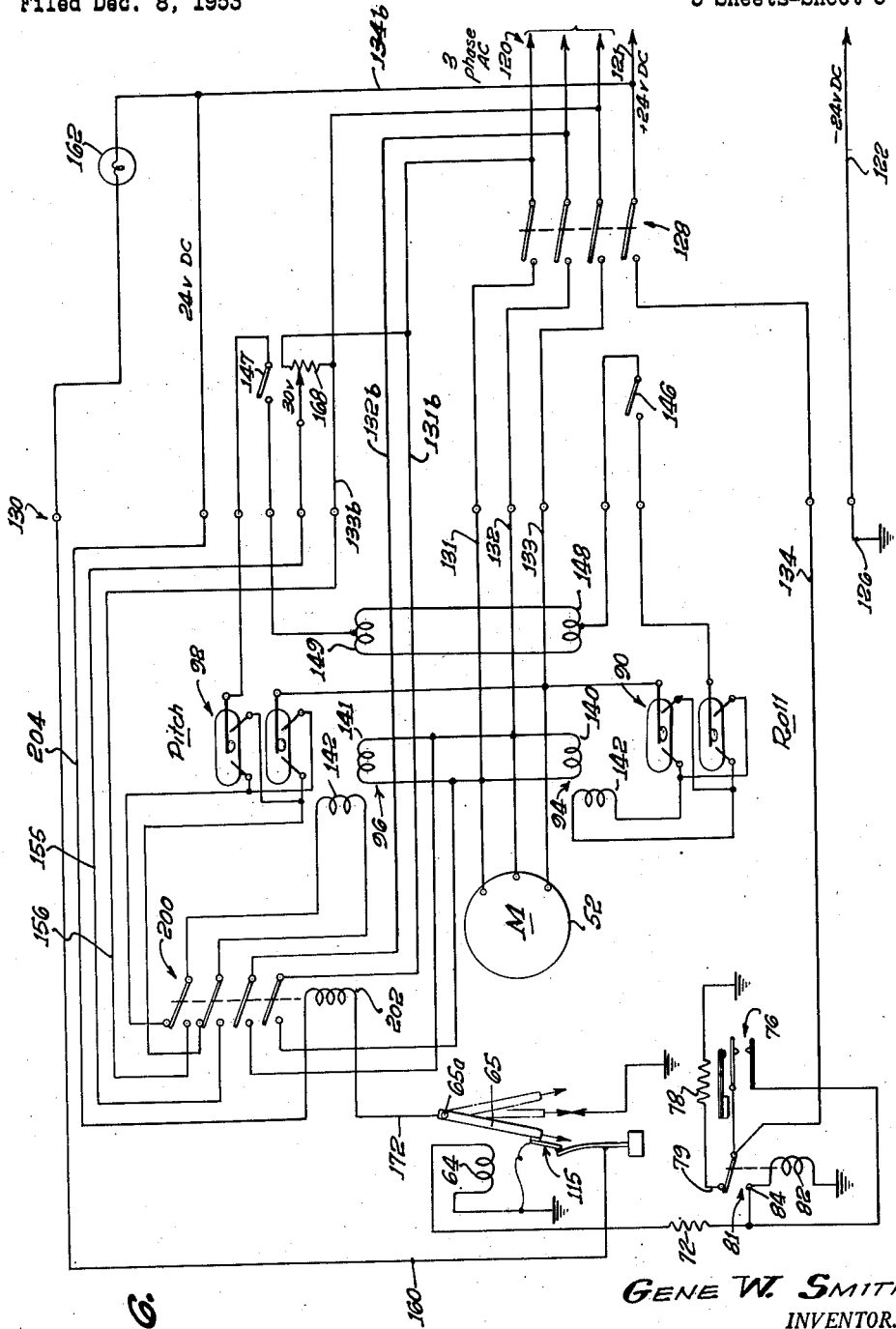
Fig. 6 is a schematic diagram corresponding to Fig. 5 and illustrating a modification.

An illustrative embodiment of the invention is shown in schematic perspective in Fig. 1. The supporting frame 10 is shown in the form of a cylindrical housing having end walls 11 and 12 and a cylindrical wall portion 13. An outer gimbal, shown schematically as a simple rectangular frame 20, is journaled on an outer gimbal axis, indicated at 21, which is fixed with respect to frame 10. As shown, axis 21 is coaxial with the frame. One of the journal bearings is indicated at 22, mounted on frame end wall 12, the other journal, which receives the pivot 13, being omitted for clarity of illustration.

An inner gimbal 40, shown schematically as a rectangular frame, is journaled on outer gimbal 20 on an inner gimbal axis 41, which is fixed on the outer gimbal and which intersects axis 21 at right angles. Inner gimbal 40 in the present embodiment is limited in its rotation about axis 41 to an angular range somewhat less than 180°. Many different types of stop means means may be used to effect such limitation. As shown, a resilient stop, such as a rubber pad, is mounted at 43 on the inner face of outer gimbal 20 in position to engage stop formations 44 fixed on inner gimbal 40. One such stop 44 appears in Fig. 1, the other being similarly placed on the other side of inner gimbal axis 41.

The gyroscope rotor is indicated schematically at 50, journaled with respect to inner gimbal 40 on a rotor axis 51, which is normal to inner gimbal axis 41 and intersects that axis at outer gimbal axis 21. Power means of any suitable type are provided for driving rotor 50. Such power means may, for example, employ compressed air or direct or alternating current electric power. The present invention will be described primarily with relation to electric rotor drive, which is ordinarily preferred, an electric motor 52 forming an integral part of rotor 50. Power leads to the rotor drive, and electrical connections for performing other functions to be described, may be carried between the relatively rotatable elements of the structure in any suitable manner, such as by use of light flexible leads or conventional slip rings, which are omitted in the figure for clarity of illustration. Also omitted from the figures are the usual gimbal pick-off devices by which desired information as to the orientation of frame 10 with respect to the vertical may be obtained.

In a gyroscope intended primarily for indicating the vertical, erecting means are ordinarily provided for the purpose of bringing rotor axis 51 into alignment with the direction of gravity. Many different types of erecting means are known and may be controlled by sensing means of various types. For example, mercury switches may be fixedly mounted on the inner gimbal, arranged to shift between open and closed condition as rotor axis 51 swings through vertical position about inner gimbal axis 41 and about outer gimbal axis 21, respectively. Such switches may, for example, energize respective solenoids and thereby control the movement of weights which throw the proper one of the gimbals out of balance in a direction to swing the rotor axis toward the vertical. Alternately, for example, the sensing means may control torque motors acting on the respective gimbal axes. That type of erecting means is further described in connection with Figs. 3 and 5.

It is well known that, during normal operation of a gyroscope of the type described, application of a torque about one of the gimbal axes 21 and 41 causes the rotor axis to swing about the other one of those gimbal axes. That precession of the rotor axis is ordinarily utilized in conventional erection systems. When the sensing means indicates deviation of the rotor axis about one of the gimbal axes, a suitable torque is applied about the other axis to correct that deviation. To obtain maximum stability of the rotor axis the erecting torques produced by conventional erecting systems are preferably or necessarily relatively small, and the resulting erection movement is relatively slow.

Furthermore, depending upon the type of erection system employed, the erecting torque may become progressively smaller at greater deviations from the vertical, even disappearing altogether when the rotor axis is horizontal. That is not a practical disadvantage during normal operation, since the deviations normally encountered are small. But when the gyroscope is first put into operation the deviation may, in general, have any value within the mechanical range of movement of the instrument. Correction of large deviations by means of the normal erection system may therefore require a relatively long time. For many purposes it is necessary to put the gyroscope into service as fast as possible after it is energized. For that purpose, either the gimbal assembly must be caged in substantially erect position before its rotor is started, or a system must be provided for rapidly correcting large deviations at the time the rotor is energized.

An important object of the present invention is to provide, during actual acceleration of the rotor, rapid correction of large deviations from the vertical about the inner gimbal axis. Power for that type of erection is obtained directly from the driving means for the rotor. When that type of rapid erection is provided, it is not necessary, although it may still be desirable, to provide any means for caging the inner gimbal, which may be left entirely free (except for limit stops of the type already described), as during normal operation. That has the obvious advantage of rendering unnecessary the relatively complex structures that have formerly been required for caging the inner gimbal.

In accordance with that aspect of the invention, when the gyroscope is not in operation the outer gimbal is caged, preferably in approximately erected position with respect to the outer gimbal axis, and the inner gimbal is left free to swing about the inner gimbal axis. The mechanism for caging the outer gimbal may be of any suitable type. For example, a caging ring 60 may be mounted on one end of outer gimbal 20 concentric with axis 21 and carrying a circumferentially distributed series of caging formations 62, shown illustratively as holes extending parallel to axis 21. A caging pin 64 is mounted with respect to frame 10 for axial movement in such position that it can engage one of the formations 62. As shown, pin 64 is mounted on the armature 65 of a solenoid 66, which is fixedly mounted on frame wall 11. The solenoid armature is pivoted at 65a on solenoid frame member 67 on an axis transverse of outer gimbal axis 21. Armature 65 is yieldingly urged by the spring 68 in a direction to insert pin 64 into one of the holes 62 of the caging ring, and thereby to lock the outer gimbal in a definite rotational position. Energization of the solenoid coil 69 swings armature 65 in the opposite direction against the force of spring 68, withdrawing pin 64 from the caging hole and thereby releasing the outer gimbal for normal operation.

In idle condition of the gyroscope, solenoid 66 is not energized, and caging pin 64 is held by spring 68 in locking position in one of the holes 62. In accordance with the invention, the gyroscope is put into operation by first energizing the rotor drive means to accelerate rotor 50, and then, after the rotor has attained sufficient speed to stabilize the outer gimbal and while the rotor is still accelerating at an appreciable rate, energizing solenoid 66 to withdraw caging pin 64 and release the outer gimbal. Continuing acceleration of the rotor, after such release of the outer gimbal, has been found to produce rapid and effective erection of the inner gimbal without appreciably displacing the outer gimbal from the position in which it was caged. The described erection of the inner gimbal brings it into approximately vertical position, from which the normal erection system can orient it accurately in a relatively short time. If the outer gimbal is not released from its caged condition until the rotor has reached substantially its operating speed, in accordance with previously known systems, the described erection of the inner gimbal does not take place. The present invention requires, in sharp contrast to previous practice, that the rotor is not at substantially full speed when the outer gimbal is released. By suitable selection of the moment of that release with respect to the time of energization of the rotor drive, it is possible, in accordance with the invention, to have sufficient rotor speed to stabilize one gimbal and sufficient remaining rotor acceleration to substantially erect the other gimbal.

An illustrative type of time delay circuit for accomplishing that result is shown in simplified form in Fig. 2. An electric power source is indicated at 70 with control switch at 71 for applying power via line 73 to rotor drive motor 52 and to the regular erecting means, indicated schematically at 74, which may be of conventional type. The winding 69 of caging solenoid 66 is connected in series with a resistor 72 and with a time delay switch 76 between line 73 and ground. Switch 76 may be of any suitable type, and is shown illustratively as a thermal time delay switch having a bimetallic element 77 that is heated by energization of a resistance winding 78, switch 76 closing when the control strip reaches a predetermined elevated temperature. Heater resistance 78 of the time delay switch is connected in series with the normally closed contact 79 of the double throw switch 81 of a relay 80 between ground and line 73. The relay coil, shown at 82, is connected in parallel with solenoid coil 69, and is therefore energized upon closure of thermal delay switch 76. The normally open contact 84 of relay switch 81 is connected to the junction of coils 69 and 82.

In operation of the system, when control switch 71 is closed to start the rotor, heater 78 is also energized. After a predetermined time interval, selected as already described, thermal delay switch 76 closes, energizing solenoid coil 69 to release the outer gimbal and at the same time energizing relay coil 82. Actuation of the relay opens the circuit through heater 78 at contact 79 and closes a holding circuit via contact 84 for both the relay and solenoid coil 69, which remain energized until the gyroscope is turned off by opening of control switch 71.

When switch 71 is opened to delete power from the gyroscope rotor and from erecting means 74, the holding relay coil 82 and solenoid coil 69 are de-energized simultaneously. Caging pin 64 is thereby inserted in whichever one of holes 62 is most nearly aligned with it at the time, locking the outer gimbal. Under normal conditions that action occurs when the gyroscope is in normal operating position, and outer gimbal 20 is therefore caged in substantially correct position. If caging pin 64 strikes the caging ring between holes 62, it may not enter a hole at once, but will do so as soon as the ring turns slightly. Such rotation of the outer gimbal normally occurs during deceleration of the rotor. The holes 62 are preferably deeply countersunk on the side of caging ring 60 toward pin 64, and the end of pin 64 is rounded or pointed to facilitate camming of the caging ring through the small angle that may be required to bring a hole into alignment with the pin. That camming action may cause appreciable precession of the rotor axis about inner gimbal axis 41, but that is immaterial since the inner gimbal becomes completely free in any case when the rotor stops.

Means are preferably provided, in connection with the described caging of the outer gimbal, for indicating to the operator whether it is caged within a suitable range of its rotational freedom about axis 21. Illustrative indicating means for that purpose include a scale support, indicated schematically at 85 in Fig. 1, which comprises a semi-circular strip or bow mounted rigidly on outer gimbal 20 coaxially with its axis 21. Bow 85 preferably has a diameter nearly equal to that of frame wall 13, and it carries on its outer face scale indications of any desired type. A sighting aperture, preferably sealed by a transparent window, is provided at 86 in frame wall 13 in vertical alignment with the center of bow 85 when the outer gimbal is in fully erected position. The visual indications on bow 85 preferably include a central dot 87 and two lines 88, which extend circumferentially from dot 87 in opposite directions through a predetermined limited angle. That angle is preferably selected as the angle through which the normal erecting system is capable of swinging the outer gimbal during the time that is available after energization of the gyroscope and before it must be in normal operation. One of the lines 88 is shown ending at 89 at an illustrative angle of about 40° from central dot 87.

In operation, after deletion of power the outer gimbal becomes caged, as already described. If the caged position of the gimbal is its normal operating position, that face is indicated to the operator by visibility of the dot 87 through window 86. If the outer gimbal has been caged in a position that deviates from normal, but by an angle that can be corrected by the normal erecting means during the time available, that fact is indicated by visibity of one of the lines 88 through window 86. In either of those instances, the gyroscope can be put into operation in the normal manner by closure of control switch 71. If, on the other hand, due to abnormal conditions at the time power is turned off, the outer gimbal becomes caged at an angle from which it cannot be erected by the normal erecting means, or cannot be so erected within the available time, that abnormal condition is indicated by absence of both dot 87 and lines 88 from the field of window 86. The operator can correct that condition by various known procedures, depending upon the particular type of installation. In many gyroscope applications, abnormal caging of the type described cannot occur, or occurs so seldom as to cause no appreciable difficulty.

Another embodiment of the invention, shown in Figs. 3 to 5, includes illustrative means for re-orienting the outer gimbal to substantially operating position as a part of the caging operation. Such orienting means are desirable in any application in which power may be deleted from the gyroscope rotor while the rotor axis is not close to normal position. The present embodiment affords the particular advantage of utilizing the normal erecting system of the gyroscope to perform that orienting function, and provides positive automatic indication to the operator whenever the orienting operation is required. It will be understood from the following description that the driving means utilized for that orienting function need not be used also for performing any normal erecting function, but may be specially provided for the present purpose.

In Fig. 3 the gimbal frames 20 and 40 are represented schematically by dashed lines, and the axes 21, 41 and 51 have the same significance as in Fig. 1. Erecting means of the torque motor type are represented schematically in Fig. 3. For convenience of description, outer gimbal axis 21 will be considered the roll axis of the craft in which the gyroscope is to be used, and inner gimbal axis 41 will be considered the pitch axis. Roll sensing means are indicated schematically at 90 and typically comprise in effect a double throw, double pole mercury switch rigidly mounted on the outer gimbal transversely of its axis 21. Pitch sensing means, schematically shown at 92 and typically of the same type, are rigidly mounted on the inner gimbal transversely of its axis 41. A roll correcting torque motor is shown schematically at 94 in position to produce a torque about axis 41 between the two gimbals and thereby to cause rotor axis 51 to precess about roll axis 21; and a pitch correcting torque motor is schematically shown at 96 in position to produce a torque about axis 21 between the outer gimbal and the instrument frame, and thereby to cause the rotor axis to precess about inner gimbal axis 41. Each torque motor comprises typically an armature rotatable in the combined field of a fixed current winding and a controlled current winding, the windings being supplied with different phases of a 3-phase power supply and arranged to produce a magnetic field that rotates in one direction or the other in accordance with the direction of current flow in the controlled current winding. That rotating field produces a directed torque upon the armature. Illustrative conventional connections for those windings and for the respective control switches of the sensing means are shown in Fig. 5, in which each sensing means is shown as two single pole, double throw switches which operate simultaneously and are connected to act as a reversing switch.

The stop means for the inner gimbal, as schematically shown in Fig. 3, comprise a rubber bumper 43a, rigidly mounted on outer gimbal 20, and cooperating stop formations 44a rigidly mounted on inner gimbal 40 by means of the bracket 44b.

A caging ring is represented at 100 in Fig. 3, rigidly mounted on the outer gimbal in the manner already described for ring 60 of Fig. 1. However, ring 100 is provided with a single caging formation 102 of special type instead of the circumferentially distributed formations 62 of the previous embodiment. The formation 102 is shown illustratively as a concentric arcuate groove 103 in the ring, extending through a limited angle that may, for example, be from 5 to 10°, with through bores 104 at its ends, as shown in Fig. 4.

A solenoid, which may be identical with solenoid 66 of Fig. 1 and which bears the same identifying numerals, carries on its armature 65 a caging pin 110. That pin comprises a relatively long axial core 111 in electrical engagement with armature 65, and a shorter bushing 112 of insulating material, which encloses all but the tip of core 111.

The solenoid frame 67 is mounted in electrically insulated relation on the main frame of the instrument, as by the block 67a of insulative material, and is, of course, insulated from solenoid winding 69.

The solenoid is mounted on the instrument frame in such position with respect to caging ring 100 that armature 65 can assume three principal distinct positions. (A) When the solenoid is energized, the pin is fully withdrawn out of contact with ring 100, as shown in Fig. 4A. (B) When the solenoid is not energized, but when caging formation 102 is not opposite the pin, spring 68 resiliently urges the end of pin core 111 into mechanical and electrical contact with the face of the ring, as shown in Fig. 4B. (C) When one of the holes 104 of caging formation 102 is opposite the pin and the solenoid is not energized, pin 110 is resiliently inserted into the caging hole, as shown in Fig. 4C. In the latter condition electrical contact between ring 100 and pin core 111 is prevented by insulated bushing 112. The limited movement of solenoid armature 65 with respect to its frame prevents contact of the armature itself with the caging ring. A fourth position of the armature is distinct, but of less importance. If groove 103 is opposite the caging pin, the latter engages the bottom of the groove and the result is substantially the same as in position B. The switching action is such that the pin and ring may make electrical contact on deactuation of relay 66 if the mechanism passes through position B in going from position A to position C; but cannot make contact as the mechanism passes from position C to position A in response to energization of the solenoid. Any switch mechanism that performs a corresponding function may be used.

In addition to carrying caging pin 110, armature 65 in Fig. 3 controls operation of a switch 115. As illustratively shown, one contact of switch 115 is mounted at 116 on armature 65 in insulated relation, as by the insulating block 117. Connection to contact 116 may be made by a flexible lead, as indicated at 117a. The other switch contact of switch 115 comprises a flexible strip 118, one end of which is rigidly mounted on the instrument frame by means of the insulated block 119, in such position that its other end electrically engages contact 116 in positions A and B of armature 65, and is spaced from contact 116 in armature position C. That structure is illustrative of any switch operating mechanism that causes a switch to be open only in fully caged condition of the outer gimbal, and to be closed under other conditions.

As shown illustratively in Fig. 5, the system receives 3-phase alternating current power, typically at 115 volts, at 120, and receives positive and negative direct current power at 121 and 122, respectively, typically at 24 volts. A multiple contact connector is indicated generally at 130, by which all electrical connections may be made between the instrument itself, shown at the left in Fig. 5, and a control panel, for example, shown at the right in Fig. 5. Connector 130 will ordinarily be considered as permanently connected for clarity of description.

The negative D. C. line from 122 is connected directly to the instrument frame, as indicated at 126, setting the potential for substantially all structural parts of the instrument, with the exception of solenoid frame 67 which is insulated from the instrument frame as already described. The three A. C. lines from 120 and the positive D. C. line from 121 pass through the four pole main control switch 128 to lines 131, 132, 133 and 134, respectively, in the instrument. Lines 131, 132 and 133 supply 3-phase power directly to rotor drive motor 52. Lines 131 and 132 supply one phase to fixed current windings 140 and 141, respectively, of roll and pitch torque motors 94 and 96, respectively. The controlled current windings of those torque motors, indicated at 142 and 143, respectively, are supplied with another phase of power at a relatively low voltage from lines 131 and 133 via respective circuits that include in series sensing switch means 90 and 92, respectively; cut-out switches 146 and 147, respectively (located outside of the instrument and permitting the erecting system to be disabled apart from the remainder of the system); and the voltage-reducing auto transformers 148 and 149. The circuit for coil 143 of pitch-controlling torque motor 96 (which acts between the outer gimbal and the instrument frame) also passes through the normally closed switch contacts of a double-pole, double-throw caging relay 150. When that relay is idle, as illustrated, both torque motors act in conventional manner, which need not be described in detail, to maintain the rotor axis vertical under control of sensing means 90 and 92. When relay 150 is actuated, control of winding 143 is transferred via the normally open contacts of the relay to lines 155 and 156. Connections for those lines will be described below.

Coil 69 of solenoid 66, coil 82 and switch 81 of relay 80, and heating element 78 and switch 76 of the time delay switch are all connected in Fig. 5 in the illustrative manner already described in connection with Fig. 2, and perform corresponding functions. Line 134 in Fig. 5 corresponds to line 73 in Fig. 2. Switch 115, operation of which by solenoid 66 has been described, is shown schematically in Fig. 5, connected between the instrument frame, represented as ground, and a line 160. Line 160 passes through connector 130 to one terminal of an indicating signal lamp 162, the other terminal of which is connected via line 163 to the positive D. C. source at 121 ahead of main switch 128. Consequently, signal lamp 162 lights whenever the outer gimbal is not fully caged, whether during normal operation of the gyroscope or when the caging pin is in intermediate position B during the caging operation.

A caging switch 165 is controlled by the operator in response to indications of lamp 162. If condition B occurs during caging, closure of switch 165 causes the outer gimbal to be automatically re-oriented to a position at which caging is completed. Caging switch 165, as shown, is a four pole switch, the contacts of which on one side are connected by respective by-pass lines to the respective live contacts of main switch 128. Closure of caging switch 165 supplies one phase of A. C. power via lines 131a and 132a to fixed current winding 141 of pitch correcting torque motor 96; and supplies another phase of A. C. power via lines 131a and 133a to lines 155 and 156, respectively, already described. The connection to line 156 is made via a voltage control potentiometer 168, the coil of which is connected between lines 131a and 133a. When caging switch 165 is closed and when caging relay 150 is actuated, the voltage between the variable contact of potentiometer 168 and line 133a is therefore supplied to controlled current winding 143 of torque motor 96.

Actuation of relay 150 is preferably controlled jointly by caging switch 165 and by the described switching action of caging pin 110. As shown, one terminal of relay coil 152 is connected via line 170 through the fourth pole of caging switch 165 and line 163 to the positive D. C. source at 121; and the other coil terminal is connected via line 172 to the solenoid frame and hence to the armature 65 of caging solenoid 66. Line 172 is therefore grounded by contact of caging pin core 111 with grounded caging ring 100 only when the caging pin is in position B. Relay coil 152 is therefore energized only when that latter condition obtains and caging switch 165 is closed.

In typical operation of the system of Figs. 3 to 5, in idle condition of the system switches 128 and 165 are open. Outer gimbal 20 is fully caged in substantially erected position and inner gimbal 40 is free. To operate the gyroscope, main switch 128 is closed, energizing rotor drive 52, the normal erecting means 94 and 96, and heater element 78 of time delay switch 76. Acceleration of the rotor is thereby started simultaneously with the start of the predetermined delay interval of switch 76. Closure of switch 76 at the end of that delay interval energizes solenoid coil 69, releasing the outer gimbal and turning on signal lamp 162. At that time the rotor speed is sufficient to stabilize the released outer gimbal, and the rate of acceleration of the rotor is still relatively high. The reaction thrust of that continuing acceleration erects the inner gimbal to substantial correct position, and the regular erection system finally brings both gimbals accurately regular erection system finally brings both gimbals accurately to their fully erected positions before, or soon after, the rotor reaches its full operating speed. The gyroscope is therefore ready for normal operation only a short time after closure of the main switch.

To put the gyroscope out of operation, main switch 128 is opened, deleting power from the rotor, from the normal erecting system and from solenoid coil 69. The latter action releases the caging pin, which may immediately enter one of the holes 104 in caging ring 100. In that case signal light 162 is turned off by opening of switch 115, showing the operator that caging has been completed.

If, at the time the main switch is opened, the outer gimbal happens to be in such position that the caging pin strikes the face of ring 100 (or strikes the bottom of groove 103 between holes 104), deceleration of the rotor normally causes sufficient rotation of the gimbal to complete caging. In fact, that rotation may become quite rapid, and the described elongation of caging formation 102 is advantageous in providing time for the caging pin to move into effective engagement under the yielding force of solenoid spring 68 even if the gimbal is rotating relatively rapidly; and at the same time providing firm holding action of the pin in a fitting hole after it enters one of the holes 104. Those holes are preferably spaced on opposite sides of the position that corresponds to full erection, so the deviation of the fully caged gimbal from normal position is only half of the angle between the holes. If caging becomes complete by the described process, signal light 162 is extinguished, indicating that fact.

If signal lamp 162 does not go out reasonably promptly after the main switch is opened, the operator knows that caging is not complete. He then need only close caging switch 165 to cause the outer gimbal to be oriented into such position that caging is completed. Thereupon the signal light goes out, and switch 165 may again be opened. The described closure of switch 165 actuates caging relay 150, since under the conditions described the caging pin is in position B. Closure of switch 165 also supplies A. C. power to the windings of torque motor 96, directly to fixed current winding 141 and via actuated relay 150 to controlled current winding 143. Torque motor 96 normally corrects deviations of the inner gimbal. Under the described conditions, however, that torque motor causes rotation of the outer gimbal, which rotation continues, through nearly 360° if necessary, until the gimbal reaches proper position for caging. To obtain satisfactory speed in that operation, potentiometer 168 is preferably arranged to provide at winding 143 a considerably higher voltage than that normally provided by transformer 149. That normal voltage may typically be about 3 volts, and the voltage supplied from potentiometer 168 may be about 30 volts. As soon as torque motor 96 brings the outer gimbal to correct position, close to full erection, caging pin 110 enters one of the holes 104, completing the caging operation.

The described use of the regular inner gimbal erecting system for orienting the outer gimbal tends to cause simultaneous rotation of the inner gimbal if the rotor is still operating at appreciable speed. That typically throws the inner gimbal against one of its limit stops where it tends to remain at least until the rotor has effectively stopped. Since means are available for erecting the inner gimbal during rotor acceleration, that action of the inner gimbal is not significant.

Fig. 6 represents an illustrative modification of the electrical system of Fig. 5 and provides completely automatic caging of the outer gimbal in substantially erect position regardless of its position at the time of opening the main switch. Auxiliary A. C. power lines for orienting the outer gimbal during caging are shown at 131b, 132b and 133b, and are connected directly to the corresponding power leads ahead of main switch 128. The caging control relay 150 of Fig. 5 is replaced by a four pole relay at 200 in Fig. 6, the upper two switches of that relay, as shown, being connected as already described for the two switches of relay 150, and performing a corresponding function of taking over control of torque motor winding 143 from the pitch sensing means. The two additional switches of relay 200 are single throw, normally open switches, through which bypass connections are carried from torque motor winding 141 to A. C. lines 132b and 133b.

The coil 202 of relay 200 is connected on one side to the frame of caging solenoid 66, as already described for relay coil 152 of Fig. 5. The other terminal of coil 202 is connected via lines 204 and 134b directly to the positive D. C. supply at 121. Signal lamp 162 is connected as in Fig. 5 and functions as already described.

The entire system of Fig. 6 operates as described for that of Fig. 5 except when caging pin 110 makes electrical contact with the face of ring 100 after opening of main switch 128. In the present embodiment, caging relay 200 is then directly actuated, energizing both coils of torque motor 96 and thereby driving the outer gimbal about its axis 21 until the caging pin enters the caging formation and locks the gimbal in substantially erected position. The relay circuit is thereby opened at the caging pin, returning relay 200 to idle condition and restoring control of torque motor 96 to sensing means 92, ready for normal operation. Signal light 162 remains lighted until caging is thus completed, when its extinction tells the operator that all is secure.

The described mechanism for causing rotor acceleration to erect the inner gimbal requires that both gimbals be free during that erection process, since it depends upon interaction between the accelerating motor and the two free gimbals. While it is preferred, for simplicity of structure, to leave the inner gimbal free continuously (subject only to the described stop means), the system can operate equally well if both gimbals are locked in idle condition of the system and during the initial phase of the rotor acceleration, so long as both gimbals are free during the final phase of that acceleration. In a system of that type, the gimbal locking means is not required to hold the inner gimbal in any particular position, since it is rapidly erected during acceleration of the rotor. The locking means may therefore be considerably simpler than those of conventional systems giving comparable speed of preparation for service.

The rotor speed at which the outer gimbal is released, in accordance with the invention, to insure proper stabilization of the free outer gimbal against violent movement and at the same time to insure erection of the inner gimbal substantially to normal position by action of the subsequent acceleration of the rotor, depends upon physical factors of the apparatus. For vertical gyroscopes of usual proportions it has been found, for example, that effective erection of the inner gimbal can be obtained in accordance with the invention if the outer gimbal is released when the rotor speed is within the range between about one tenth and about one half of normal operating speed. The time at which any given percentage of operating speed is reached by the rotor depends upon the relation between rotor inertia and accelerating torque delivered by the driving motor, which torque typically varies with the rotor speed, the manner of that variation being quite different for A. C. and D. C. motors. For example, with a D. C. motor capable of accelerating the rotor to full speed in about 30 seconds, the outer gimbal may be released as early as one to three seconds after power is applied to the motor; while with an A. C. motor that requires about a minute to reach full speed it may be desirable to release the outer gimbal from ten to twenty seconds after power is applied.

I claim:

1. In a gyroscope, a frame, outer and inner gimbals journaled on respective mutually perpendicular axes on the frame and on the outer gimbal, respectively, a rotor journaled on the inner gimbal on a rotor axis perpendicular to the inner gimbal axis, selectively energizable driving means for the rotor, caging means actuable upon deenergization of the rotor driving means and acting to lock the outer gimbal only when the latter is substantially in predetermined locking relation with respect to the frame, gimbal orienting means for orienting the outer gimbal to locking relation, said gimbal orienting means comprising electric means energizable to apply a torque directly between the outer gimbal and the frame, and control means for energizing the gimbal orienting means in response to actuation of the caging means when the outer gimbal is out of locking relation.

2. In a gyroscope, a frame, outer and inner gimbals journaled on respective mutually perpendicular axes on the frame and on the outer gimbal, respectively, a rotor journaled on the inner gimbal on a rotor axis perpendicular to the inner gimbal axis, selectively energizable driving means for the rotor, caging means for the outer gimbal comprising a locking member shiftable between a gimbal releasing position, a gimbal locking position and an intermediate position, yielding means acting in response to deenergized condition of the rotor driving means to yieldingly urge the locking member toward gimbal locking position, means blocking movement of the locking member at its intermediate position unless the outer gimbal is substantially in predetermined locking relation with respect to the frame, and gimbal orienting means for orienting the outer gimbal to locking relation, said gimbal orienting means comprising electric means energized in response to blocked condition of the locking member and acting when energized to apply a torque between the outer gimbal and the frame.

3. In a gyroscope, a frame, outer and inner gimbals journaled on respective mutually perpendicular axes on the frame and on the outer gimbal, respectively, a rotor journaled on the inner gimbal on a rotor axis perpendicular to the inner gimbal axis, selectively energizable driving means for the rotor, caging means for the outer gimbal comprising a locking member shiftable between a gimbal releasing position, a gimbal locking position and an intermediate position, yielding means acting in response to deenergized condition of the rotor driving means to yieldingly urge the locking member toward gimbal locking position, means blocking movement of the locking member at its intermediate position unless the outer gimbal is substantially in predetermined locking relation with respect to the frame, and gimbal orienting means for orienting the outer gimbal to locking relation, said gimbal orienting means comprising electric means energized in response to blocked condition of the locking member and acting when energized to apply a torque between the outer gimbal and the frame, and uncaging means acting in response to energization of the rotor driving means to shift the locking member to its gimbal releasing position when the rotor has reached a predetermined speed appreciably less than its normal operating speed.

4. In a gyroscope, a frame, outer and inner gimbals journaled on respective mutually perpendicular axes on the frame and on the outer gimbal, respectively, a rotor journaled on the inner gimbal on a rotor axis perpendicular to the inner gimbal axis, sensing means responsive to the position of the inner gimbal, erecting means for the inner gimbal normally acting under control of the sensing means to apply a torque between the outer gimbal and the frame to erect the inner gimbal, caging means actuable to lock the outer gimbal substantially in predetermined locking relation with respect to the frame, and means for driving the outer gimbal to locking relation, the last said means comprising control means actuable to energize the erecting means independently of the sensing means.

5. In a gyroscope, a frame, outer and inner gimbals journaled on respective mutually perpendicular axes on the frame and on the outer gimbal, respectively, a rotor journaled on the inner gimbal on a rotor axis perpendicular to the inner gimbal axis, selectively energizable driving means for the rotor, sensing means responsive to the position of the inner gimbal, erecting means energizable with the rotor driving means and normally acting under control of the sensing means to apply a torque between the outer gimbal and the frame to erect the inner gimbal, caging means actuable upon deenergization of the rotor driving means to lock the outer gimbal substantially in predetermined locking relation with respect to the frame, and means for driving the outer gimbal to locking relation, the last said means comprising control means actuable to energize the erecting means independently of the rotor driving means and the sensing means.

6. In a gyroscope, a frame, outer and inner gimbals journaled on respective mutually perpendicular axes on the frame and on the outer gimbal, respectively, a rotor journaled on the inner gimbal on a rotor axis perpendicular to the inner gimbal axis, selectively energizable driving means for the rotor, sensing means responsive to the position of the inner gimbal, erecting means energizable with the rotor driving means and normally acting under control of the sensing means to apply a torque between the outer gimbal and the frame to erect the inner gimbal, caging means actuable upon deenergization of the rotor driving means and acting to lock the outer gimbal only when the latter is substantially in locking relation with respect to the frame, and gimbal orienting means for orienting the outer gimbal to locking relation, said gimbal orienting means being actuated in response to actuation of the caging means when the outer gimbal is out of locking relation, and acting to energize the erecting means independently of the sensing means to drive the outer gimbal irrespective of precession of the inner gimbal.

7. In a gyroscope, a frame, outer and inner gimbals journaled on respective mutually perpendicular axes on the frame and on the outer gimbal, respectively, a rotor journaled on the inner gimbal on a rotor axis perpendicular to the inner gimbal axis, selectively energizable driving means for the rotor, caging means for the outer gimbal comprising a locking member shiftable between a gimbal releasing position, a gimbal locking position and an intermediate position, yielding means acting in response to deenergized condition of the rotor driving means to yieldingly urge the locking member toward gimbal locking position, means blocking movement of the locking member at its intermediate position unless the outer gimbal is substantially in predetermined locking relation with respect to the frame, and signal means acting under control of the locking member and responsive to gimbal locking position of the member.

8. In a gyroscope, a frame, outer and inner gimbals journaled on respective mutually perpendicular axes on the frame and on the outer gimbal, respectively, a rotor journaled on the inner gimbal on a rotor axis perpendicular to the inner gimbal axis, selectively energizable driving means for the rotor, caging means for the outer gimbal comprising a locking member shiftable between a gimbal releasing position, a gimbal locking position and an intermediate position, yielding means acting in response to deenergized condition of the rotor driving means to yieldingly urge the locking member toward gimbal locking position, means blocking movement of the locking member at its intermediate position unless the outer gimbal is substantially in predetermined locking relation with respect to the frame, and signal means having two alternative conditions, the signal means being shiftable to one condition by virtue of presence of the locking member in its gimbal locking position and being shiftable to its other condition by virtue of presence of the locking member either in its gimbal releasing position or in its intermediate position.

9. In a gyroscope, a frame, outer and inner gimbals journaled on respective mutually perpendicular axes on the frame and on the outer gimbal, respectively, a rotor journaled on the inner gimbal on a rotor axis perpendicular to the inner gimbal axis, driving means for the rotor, stop means acting between the inner and outer gimbals acting to hold them out of a common plane, control means for selectively energizing and deenergizing the rotor driving means, caging means actuable upon deenergization of the rotor driving means to lock the outer gimbal in substantially erect position with respect to the frame, the inner gimbal remaining free within the limits set by the stop means, and erecting means for initially erecting the inner gimbal upon reenergization of the rotor driving means, said erecting means acting to maintain actuation of the caging means to hold the outer gimbal in locked condition during a first phase of rotor acceleration and to deactuate the caging means to release the outer gimbal from locked condition during a subsequent phase of rotor acceleration, the acceleration during the first phase bringing the rotor speed from zero to a predetermined intermediate speed sufficient to stabilize the outer gimbal in its said substantially erect position, and the acceleration during the second phase substantially erecting the inner gimbal by interaction of the accelerating rotor and the two free gimbals.

10. In a gyroscope, a frame, outer and inner gimbals journaled on respective mutually perpendicular axes on the frame and on the outer gimbal, respectively, a rotor journaled on the inner gimbal on a rotor axis perpendicular to the inner gimbal axis, driving means for the rotor, stop means acting between the inner and outer gimbals acting to hold them out of a common plane, control means for selectively energizing and deenergizing the rotor driving means, caging means actuable upon deenergization of the rotor driving means to lock the outer gimbal in substantially erect position with respect to the frame, the inner gimbal remaining free within the limits set by the stop means, and erecting means for initially erecting the inner gimbal upon reenergization of the rotor driving means, said erecting means acting to maintain actuation of the caging means to hold the outer gimbal in locked condition during a first phase of rotor acceleration and to deactuate the caging means to release the outer gimbal from locked condition during a subsequent phase of rotor acceleration, the acceleration during the first phase bringing the rotor speed from zero to an intermediate speed between about one tenth and about one half of normal operating speed sufficient to stabilize the outer gimbal in its said substantially erect position, and the acceleration during the second phase substantially erecting the inner gimbal by interaction of the accelerating rotor and the two free gimbals.

References Cited in the file of this patent

UNITED STATES PATENTS

| | | |
|---|---|---|
| 1,704,489 | Sperry | Mar. 5, 1929 |
| 2,524,553 | Wendt | Oct. 3, 1950 |
| 2,645,942 | Hurlburt et al. | July 21, 1953 |
| 2,741,922 | Nolan et al. | Apr. 17, 1956 |

FOREIGN PATENTS

| | | |
|---|---|---|
| 682,528 | Great Britain | Nov. 12, 1952 |